(12) United States Patent
Kim et al.

(10) Patent No.: US 6,398,942 B1
(45) Date of Patent: Jun. 4, 2002

(54) ELECTROCHEMICAL MACHINING PROCESS FOR FABRICATION OF CYLINDRICAL MICROPROBE

(75) Inventors: Soo Hyun Kim, Taejon; Young Mo Lim, Kyeonggi-do; Hyun Jun Lim, Taejon, all of (KR)

(73) Assignee: Korean Advanced Institute of Science and Technology, Taejon (KR)

( * ) Notice: Subject to any disclaimer, the term of this patent is extended or adjusted under 35 U.S.C. 154(b) by 82 days.

(21) Appl. No.: 09/706,292

(22) Filed: Nov. 3, 2000

(30) Foreign Application Priority Data

Oct. 5, 2000 (KR) .......................................... 2000-58440

(51) Int. Cl.[7] .................................................. C25F 4/00
(52) U.S. Cl. ........................ 205/645; 205/641; 205/644
(58) Field of Search ................................. 205/641, 644, 205/645

(56) References Cited

U.S. PATENT DOCUMENTS 5,885,434 A * 3/1999 Suda et al. .................. 205/645

* cited by examiner

*Primary Examiner*—Arun S. Phasge

(57) ABSTRACT

Disclosed is an electrochemical machining process for fabrication of cylindrical microprobes, which is effected by the tool acting as the cathode against the workpiece acting as the anode, taking advantage of a chemical reaction occurring between the workpiece and the tool, both being beneath the surface of an electrolyte, under such a controlled electric field that the workpiece can be machined to have a uniform diameter throughout its entire length. The electrochemical machining can be carried out with greater precision because a precise machining process because the volume to be additionally processed owing to the surface tension generated when the workpiece is dipped into the electrolyte is taken into consideration.

11 Claims, 4 Drawing Sheets

ELECTROCHEMICAL MACHINING PROCESS FOR FABRICATION OF CYLINDRICAL MICROPROBE

BACKGROUND OF THE INVENTION

1. Field of the Invention

The present invention relates, in general, to an electrochemical machining process and, more particularly, to an electrochemical machining process capable of fabricating a cylindrical microprobe having a uniform diameter throughout its entire length by properly controlling an applied electric field.

2. Description of the Prior Art

Electrochemical machining, also known as electrolytic machining, is a technique to remove excess metal by electrolytic dissolution, effected by the tool acting as the cathode against the workpiece acting as the anode. That is, a chemical reaction occurs between the workpiece and the tool, both being beneath the surface of an electrolyte, under an electric field to dissolve the workpiece into the electrolyte. Usually, the electrochemical machining procedure is carried out through the following four steps: migration of ions of the electrolyte to the surface of the electrodes; reaction of metal atoms on the workpiece with the ions to form molecules; conversion of the molecules into stable ions; and diffusion of the stable ions into the electrolyte.

On the whole, the characteristics of the electrochemical machining are determined by the rates of the four steps. For instance, where the rate at which metal atoms on the workpiece react with ions of the electrolyte to form molecules is greater than the rate at which the molecules are converted into stable ions, the electrochemical machining characteristic is of electrolytic polishing, that is, the final appearance of the metal surface is smoothed and enhanced by making it an anode in the electrolyte during the electrochemical machining procedure. On the other hand, in the reverse case, the electrochemical machining characteristic is of electrolytic etching, that is, the surface of the metal is engraved by electrolysis during the electrochemical machining procedure. Consequently, differences in rate among the four steps of the electrochemical machining procedure have a decisive influence on the appearance and shape of the workpiece. Typically, the dissolution rate of the workpiece is determined by the fourth step, the diffusion of the ions into the electrolyte.

Electrolytic etching is usually used to fabricate fine probes with a degree of precision of several nanometers. In this regard, this process is conducted in relatively low concentrations of electrolytes under a relatively weak electric field. During the electrolytic etching, the workpiece typically undergoes the dissolution at a faster rate on its sites which have large curvatures, e.g., end portions, than on lengthwise side portions, thus being transformed into an asymptotic cone. This phenomenon is called a geometric effect.

Problems with such conventional electrolytic etching are as follows.

Because of their being located at different depths from the surface of the electrolyte, portions of the workpiece are subjected to different machining conditions, which cause inconstant local dissolution rates. Accordingly, uniformly shaped-workpieces with ultrafine diameters are difficult to produce with such conventional electrolytic etching. Additionally, such different local dissolution rates make it difficult to precisely process the workpiece into various shapes.

SUMMARY OF THE INVENTION

With the problems in mind, the present invention has an object of providing an electrochemical machining process for fabricating cylindrical microprobes having uniform diameters throughout their entire lengths.

It is another object of the present invention to provide an electrochemical machining process for fabricating cylindrical microprobes into various shapes with precision.

Based on the present invention, the above objects could be accomplished by a provision of an electrochemical machining process for the fabrication of a cylindrical microprobe, comprising: a preparatory step for measuring a contact point through which an electrical current is first flowed when a workpiece set as an anode is brought into the electrolyte after immersing a cathodic tool in the electrolyte and for dipping the workpiece in an electrolyte to the length to be processed on the basis of the measured contact point after removal of the applied electric field; a condition-setting step for setting the diameter to be processed of the workpiece, the electrochemical equivalent volume constant of the workpiece, the current density to be applied across the electrodes, and the machining time interval for which to apply the current; a machining step for electrochemically machining the workpiece while continuously calculating and measuring changes in the surface area of the workpiece, the electric current flowing through the electrolyte, the quantity of electricity applied, and the diameter of the workpiece with machining time; a finishing step for determining whether or not the diameter of the workpiece reaches the preset value or whether the machining step is required to be repeated to further approximate the diameter of the workpiece to the preset value, and stopping the machining step if a desired value is obtained from the measured diameter of the workpiece.

As the electrochemical machining process proceeds, the diameter of the workpiece is changed as calculated according to the following equation:

$$A_m = \pi[LD + H(D_o + 2D)/3]$$

wherein, $A_m$ is the surface area of the workpiece, which changes as the electrochemical machining process proceeds, represented in $mm^2$; L is the length of the workpiece's portion to be processed, represented in mm; D is the diameter of the workpiece's portion processed, which changes as the electrochemical machining process proceeds, represented in mm; and $D_o$ is the original diameter of the workpiece's portion to be processed, represented in mm.

During the electrochemical machining process, the electric current to be applied across the electrodes is calculated according to the following equation:

$$i = A_m J$$

wherein, i is a current applied per time, represented in C/sec; $A_m$ is the surface area of the workpiece's portion processed, which charges as the electrochemical machining process proceeds, represented in $mm^2$; and J is a current density, represented in $C/mm^2$ sec.

As for the quantity of electricity applied, it is controlled according to the following equation:

$$Q_t = Q_p + i\Delta t$$

wherein, $Q_t$ is the total quantity of electricity applied for entire machining time period, represented in C; $Q_p$ is the quantity of electricity used in the previous machining round, represented in C; and $\Delta t$ is the electrochemical machining period of time, represented in sec.

The diameter of the workpiece processed changes as the electrochemical machining process proceeds and is calculated from the following equation:

$$\pi(D_o - D)[L(D_o + D)/4 + h(3D_o + 2D)/15]/a_e = Q_t$$

wherein, D is the diameter of the workpiece, which changes as the electrochemical machining process proceeds, represented in mm; $D_o$ is the original diameter of the workpiece's portion to be processed, represented in mm; $Q_t$ is the total quantity of electricity applied for entire machining time period, represented in C; L is the length of the workpiece's portion to be processed, represented in mm; h is the practical length of the workpiece which is in contact with the electrolyte owing to the surface tension, represented in mm; and $a_e$ is an electrochemical equivalent volume constant of the workpiece.

In an version of the present invention, the machining step is carried out in such a way that metal ions on the surface of immersed portions of the workpiece are controllably dissolved and diffused into the electrolyte through the application of an electric current across the electrodes.

The cathodic tool may be made of various conductive metals, but preferably of carbon.

Irrespective of being acidic or alkaline, ordinary electrolytes used for general electrolytic processes may be employed in the present invention. Preferable is a KOH solution with a concentration of 4–6 mM. However, the type and concentration of the electrolyte can be changed according to the material to be processed.

Prior to the preparatory step, the workpiece is preferably cleaned through ultrasonication with acetone and distilled water to remove impurities from the surface of the workpiece.

This preparatory step S10 is requisite for a precise machining process because the volume to be additionally processed owing to the surface tension must be taken into consideration and measured. The volume to be additionally processed owing to the surface tension generated when immersing the workpiece into the electrolyte can be calculated from the following equation:

$$V_p = \pi h(-2D^2 - D_o D + 3D_o^2)/15$$

wherein, $V_p$ is a volume which is additionally processed owing to the surface tension generated when the workpiece is dipped into the electrolyte, represented in mm$^3$; h is the practical length of the workpiece which is in contact with the electrolyte owing to the surface tension, represented in mm;

D is the diameter of the workpiece's portion processed, which changes as the electrochemical machining process proceeds, represented in mm; $D_o$ is the original diameter of the workpiece's portion to be processed, represented in mm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

In electrochemical machining, a workpiece is processed by a tool while immersed in an electrolyte while an electric field is applied across the electrodes: the workpiece acting as an anode and the tool acting as a cathode. When the cathodic tool is in contact with the anodic workpiece, the electrochemical machining characteristic is of electrochemical grinding. On the other hand, when the electrolytic process is carried out with a space between the cathodic tool and the anodic workpiece, the electrochemical machining characteristic is of electrolytic type engraving. Generally, electrochemical machining means the latter.

When an electric field is applied across the gap between the workpiece as an anode and the tool as a cathode in an electrolyte, an oxidation process occurs on the anode, in which the anode loses electrons, producing metal ions which are in turn dissolved into the electrolyte. Meanwhile, the cathode is subjected to a reduction process. Metal ions within the electrolyte gain electrons around the cathode, being deposited in the form of atoms or molecules on the cathode. Through the oxidation process, the workpiece is electrolytically processed by the dissolving of excess metal in the electrolyte. In electrochemical machining, the electric field, e.g., the current, applied across the anodic workpiece and the cathodic tool is controlled to allow the workpiece to be uniformly processed along its length, thereby fabricating microprobes several micrometers across suitable for use in tools for micro punching or electrical discharge machining to form micro holes.

Figure 1:
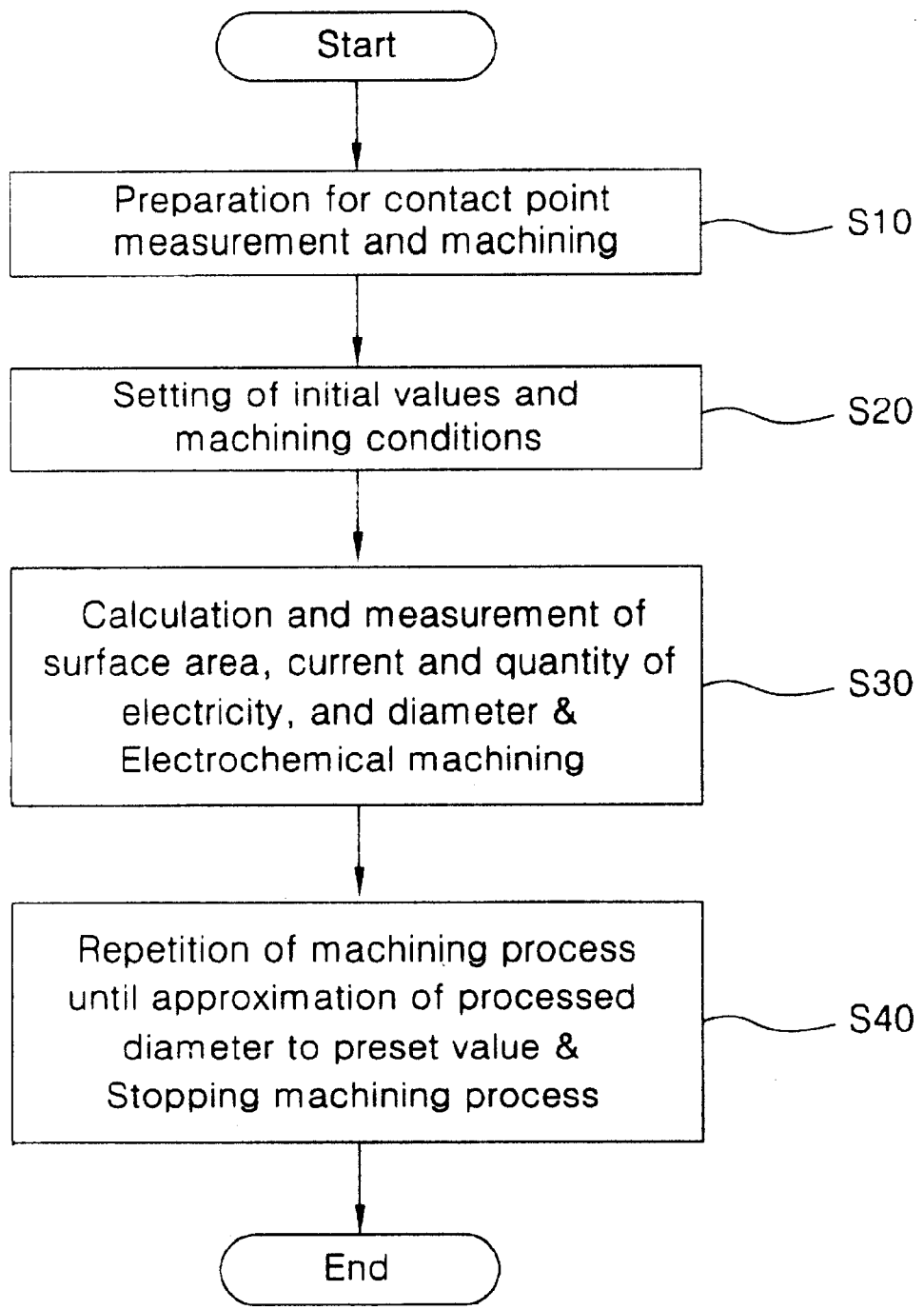
FIG. 1 is a flow chart of an electrochemical machining process for fabricating a cylindrical microprobe, according to the present invention.

With reference to FIG. 1, there is a flow chart of an electrochemical machining process for fabricating a cylindrical microprobe, according to the present invention. As seen in the flow chart, the electrochemical machining process is largely composed of the following four steps. These steps will be described in association with other figures.

First, a preparatory step S10 is provided for measuring a contact point through which a current is first flowed when a workpiece 3 set as an anode is brought into the electrolyte after immersing a cathodic tool in the electrolyte and for dipping the workpiece 3 in an electrolyte 5 to the length to be processed on the basis of the measured contact point after removal of the applied electric field.

In this preparatory step S10, the measurement of the contact point is to more precisely carry out the machining in consideration of the surface tension generated when the workpiece 3 is dipped into the electrolyte 5.

Second, a condition-setting step S20 is provided for setting the diameter to be processed of the workpiece 3, the electrochemical equivalent volume constant of the workpiece 3, the current density to be applied across the electrodes, and the machining time interval for which to apply the curr/Unt.

Next, a machining step S30 is provided for electrochemically machining the workpiece 3 while continuously calculating and measuring changes in the surface area of the workpiece 3, the electric current flowing through the electrolyte, the quantity of electricity applied, and the diameter of the workpiece 3 with machining time.

Finally, a finishing step S40 is provided for determining whether or not the diameter of the workpiece 3 reaches the preset value or whether the machining step S30 is required to be repeated to further approximate the diameter of the workpiece 3 to the preset value and stopping the machining step S30 if a desired value is obtained from the measured diameter of the workpiece 3.

In the electrochemical machining process of the present invention, a diffusion effect is created by controlling the quantity of electricity applied during the machining and keeping the current density constant over the material of the workpiece, so as to compensate for the geometric effect, which usually occurs upon electrochemical machining. According to the diffusion effect, contrary to the geometric effect of dissolving the workpiece at a greater rate on its end portion than on lengthwise portions, the finally machined workpiece has a larger diameter at a portion nearer the end portion. Accordingly, the workpiece can b machined to have a uniform diameter throughout its entire length by properly combining the geometric effect and the diffusion effect. To this end, parameters of the electric field applied to the electrochemical machining system, including current and current density, are so controlled that the rate at which the workpiece 3 is dissolved is balanced against the rate at which the ions of the workpiece 3 are diffused away, thereby fabricating a cylindrical microprobe, in accordance with the present invention.

For a more precise processing, the workpiece 3 should be cleaned to remove impurities from the surface thereof prior to the preparatory step 3. In this regard, the workpiece 3 is preferably sonicated in acetone and distilled water.

Figure 2:
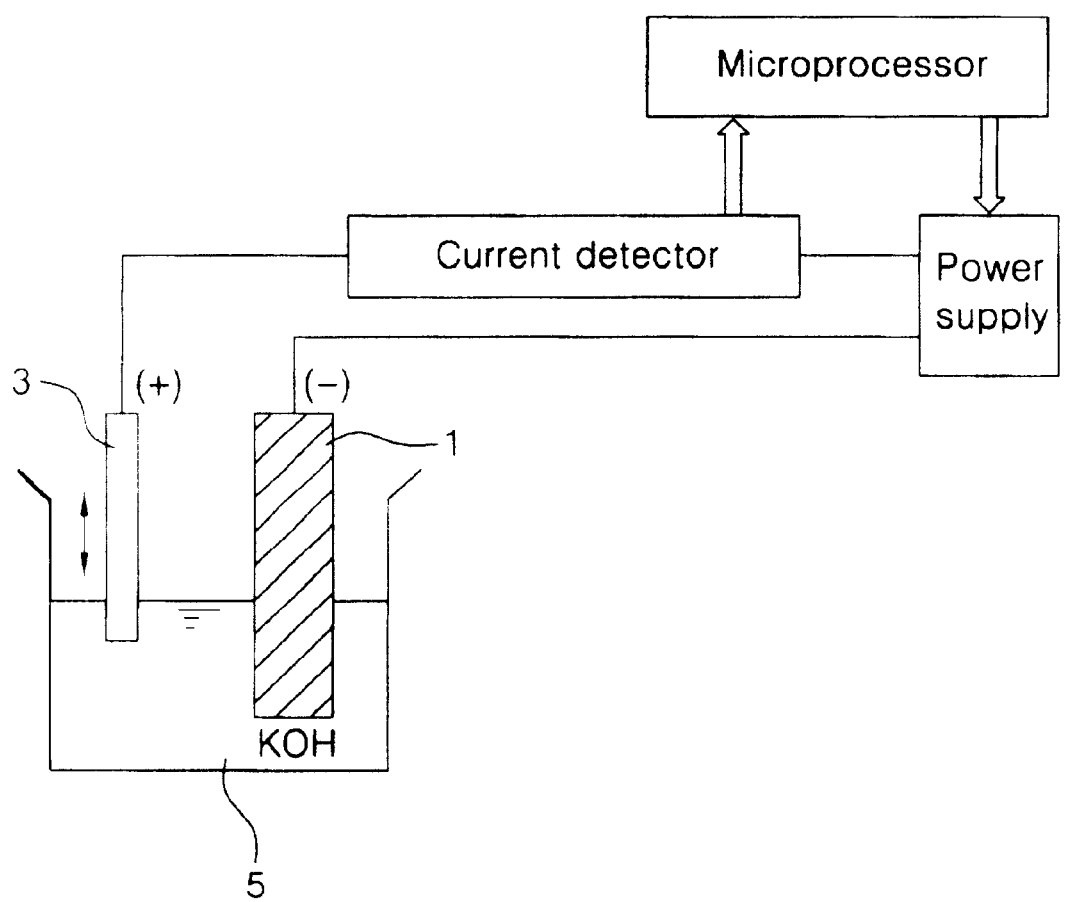
FIG. 2 is a schematic view illustrating an electrochemical machining system according to the present invention.

Referring to FIG. 2, there is illustrated an electrochemical machining system according to the present invention. As seen in this illustration, the electrochemical machining system is composed essentially of a cathodic bar 1, a workpiece 3, an electrolyte 5, a power supply, a current detector, and a microprocessor. The cathodic bar 1 and the workpiece 3 are both dipped in the electrolyte 5, which is KOH, during the electromechanical machining. As an electric potential is generated between the cathode bar 1 and the workpiece 3 by the power supply, an electric current flows through the circuit, dissolving the dipped portion of the workpiece 3 into the electrolyte 5.

During the electrochemical machining process, changes in the surface area of the workpiece 3 and in the diameter of the machined portion of the workpiece 3, the electric current applied and the total quantity of electricity are calculated by the current detector and the microprocessor connected thereto. The calculated results, which are viewed on a display, are the basis on which the microprocessor controls the electric current so as to process the workpiece 3 to the desired diameter. That is, under the influence of the applied electric field controlled through the microprocessor, the workpiece 3 is electrochemically machined into a desired microprobe several micrometers across.

Figure 3:
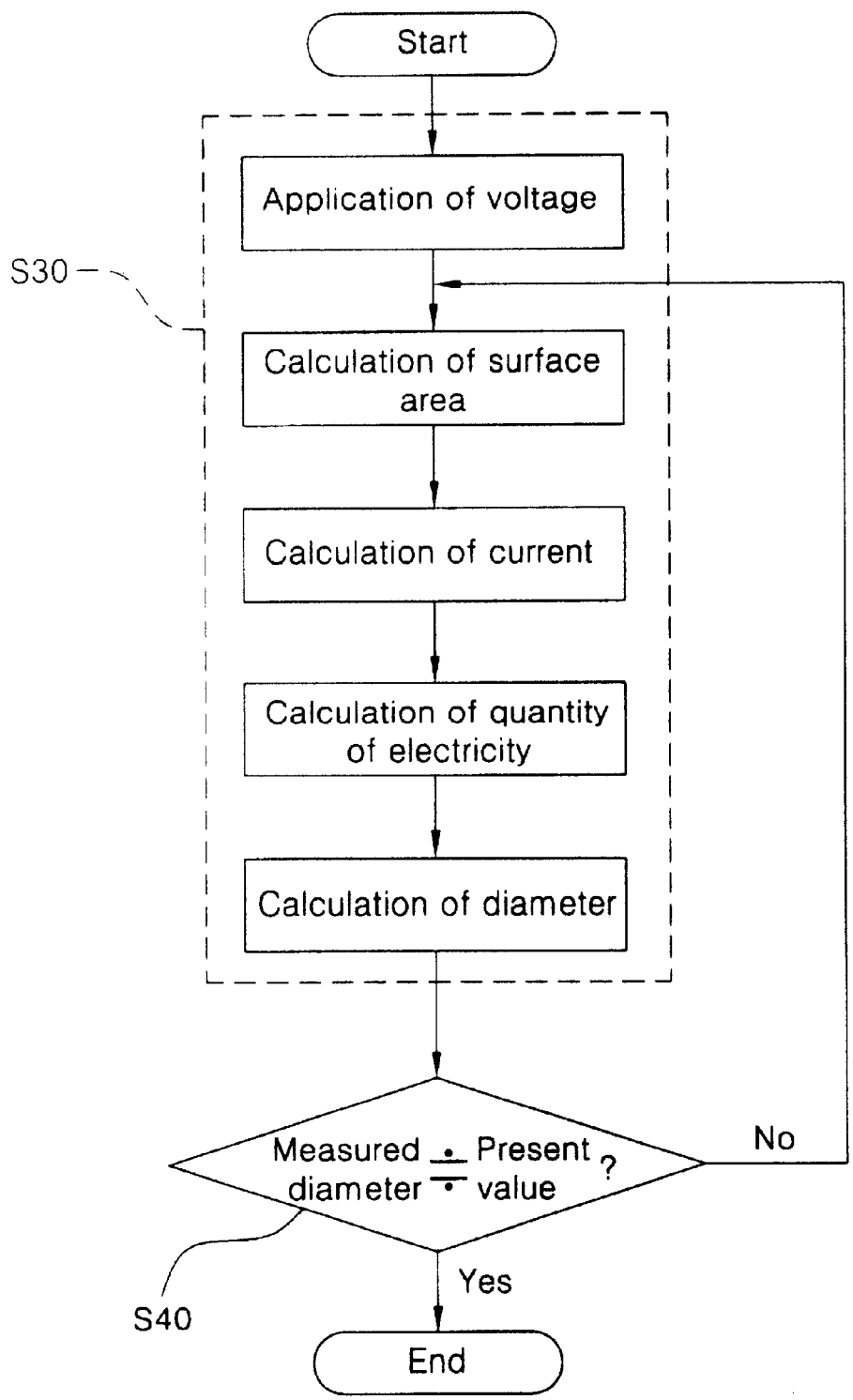
FIG. 3 is a flow chart detailing the machining step S30 and the finishing step S40 described in FIG. 1.

Turning to FIG. 3, there is a flow chart giving a detail of the machining step S30 and the finishing step S40 described in FIG. 1.

As described above, the machining step S30 is initiated after the condition-setting step S20 for setting the diameter and length to be processed of the workpiece 3, the electrochemical equivalent volume constant of the workpiece 3, the current density to be applied across the electrodes, and the machining time interval for which to apply the current.

In the machining step S30, the electrochemical machining of the workpiece 3 is conducted while continuously calculating and measuring changes in the surface area of the workpiece 3, the electric current flowing through the electrolyte, the quantity of electricity applied, and the diameter of the workpiece 3 with machining time.

The machining step S30 is continuously r/Upeated until the diameter of the machined portion of the workpiece is approximated closely to the preset value. At the finishing sep S40, it is determined whether the machined diameter approximates a desired final value, and if the value has been detected, to stop the machining step S30.

The diameter of the workpiece 3, which is changed as processed during the electrochemical machining, is calculated according to the following equation:

$$A_m = \pi[LD + H(D_o + 2D)/3]$$

wherein, $A_m$ is the surface area of the workpiece, which changes as the electrochemical machining process proceeds, represented in mm$^2$;

L is the length of the workpiece's portion to be processed, represented in mm;

D is the diameter of the workpiece's portion processed, which changes as the electrochemical machining process proceeds, represented in mm; and $D_o$ is the original diameter of the workpiece's portion to be processed, represented in mm.

During the electrochemical machining process, the current to be applied across the electrodes is calculated according to the following equation:

$$i = A_m J$$

wherein, i is a current applied per time, represented in C/sec;

$A_m$ is the surface area of the workpiece's portion processed, which changes as the electrochemical machining process proceeds, represented in mm$^2$; and J is a current density, represented in C/mm$^2$ sec.

Also, the quantity of electricity as a result of the flowing of the current is calculated according to the following equation:

$$Q_t = Q_p + i\Delta t$$

wherein, $Q_t$ is the total quantity of electricity applied for the entire machining time period, represented in C;

$Q_p$ is the quantity of electricity used in the previous machining round, represented in C; and $\Delta t$ is the electrochemical machining period of time, represented in sec.

The diameter of the workpiece's portion processed, which changes as the electrochemical machining process proceeds can be calculated from the following equation:

$$\pi(D_o - D)[L(D_o + D)/4 + h(3D_o + 2D)/15]/a_e = Q_t$$

wherein,

D is the diameter of the workpiece's portion processed, which changes as the electrochemical machining process proceeds, represented in mm;

$D_o$ is the original diameter of the workpiece's portion to be processed, represented in mm.

$Q_t$ is the total quantity of electricity applied for entire machining time period, represented in C;

L is the length of the workpiece's portion to be processed, represented in mm;

h is the practical length of the workpiece which is in contact with the electrolyte owing to the surface tension, represented in mm; and $a_e$ is an electrochemical equivalent volume constant of the workpiece.

Figure 4:
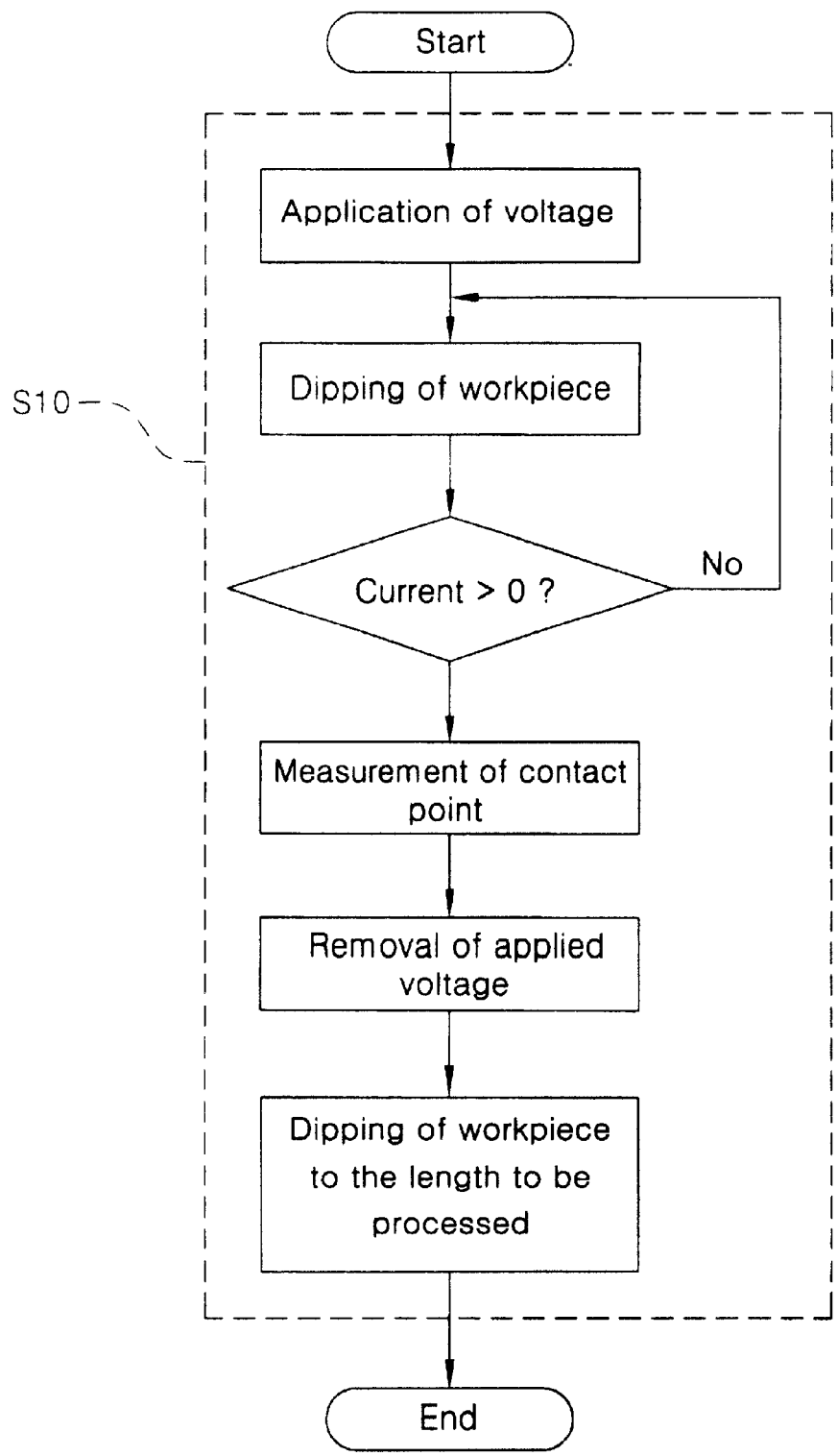
FIG. 4 is a flow chart detailing the preparatory step S10 described in FIG. 1.

With reference to FIG. 4, there is a flow chart giving a detail of the preparatory step S10 described in FIG. 1.

As seen in FIG. 1, the preparatory step S10 starts with the application of an electric potential to the workpiece 3 and the cathode bar 1. This cathode bar 1 is immersed in the electrolyte 5, followed by dipping the workpiece 3 into the electrolyte 5. Then, a contact point is measured through which a current is first flowed when the workpiece 3 set as an anode is brought into the electrolyte 5 after immersing the cathode bar in the electrolyte.

Afterwards, the electric field applied across the electrodes is removed and the workpiece is taken out of the electrolyte. On the basis of the measured contact point, the workpiece 3 is dipped in an electrolyte 5 to the length to be processed.

This preparatory step S10 is requisite for a precise machining process because the volume to be additionally processed owing to the surface tension must be taken into consideration and measured.

The volume to be additionally processed owing to the surface tension generated when immersing the workpiece into the electrolyte can be calculated from the following equation:

$$V_p = \pi h(-2D^2 - D_o D + 3D_o^2)/15$$

wherein, $V_p$ is a volume which is additionally processed owing to the surface tension generated when the workpiece is dipped into the electrolyte, represented in mm$^3$;

h is is the practical length through which the workpiece is in contact with the electrolyte owing to the surface tension, represented in mm;

D is the diameter of the workpiece's portion processed, which changes as the electrochemical machining process proceeds, represented in mm;

$D_o$ is the original diameter of the workpiece's portion to be processed, represented in mm.

Preferably, the cathode bar 1 is made of carbon. But, it should be understood that various cathode bars can be selected depending on workpiece materials. Such workpiece-dependent variation is also true of the electrolyte, although KOH is mentioned above. Also, when the machining conditions, including the quantity of electricity supplied, the current density set, the concentration of the electrolyte and so on, are changed, various final shapes of the workpiece are made possible.

As described hereinbefore, a workpiece can be machined under such a control that the rate at which the workpiece is dissolved is balanced against the rate at which the ions of the workpiece are diffused away, thereby fabricating a cylindrical microprobe which is constant in diameter throughout its entire length, in accordance with the electrochemical machining process of the present invention. Also, changes in the machining conditions can result in various diameters in the workpiece. Further, because the workpiece is machined after taking account of the influence of the surface tension generated between the electrolyte and the workpiece, the present invention can more precisely carry out the machining. Furthermore, the electrochemical machining process of the present invention can be applied to large workpieces and treat many workpieces within a short period of time because the machining is carried out by taking advantage of a chemical reaction without a need to bring the tool into contact with the workpiece.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An electrochemical machining process for the fabrication of a cylindrical microprobe, comprising:

a preparatory step for measuring a contact point through which an electrical current is first flowed when a workpiece set as an anode is brought into the electrolyte after immersing a cathodic tool in the electrolyte and for dipping the workpiece in an electrolyte to the length to be processed on the basis of the measured contact point after removal of the applied electric field;

a condition-setting step for setting the diameter to be processed of the workpiece, the electrochemical equivalent volume constant of the workpiece, the current density to be applied across the electrodes, and the machining time interval for which to apply the current, a machining step for electrochemically machining the workpiece while continuously calculating and measuring changes in the surface area of the workpiece, the electric current flowing through the electrolyte, the quantity of electricity applied, and the diameter of the workpiece with machining time;

a finishing step for determining whether or not the diameter of the workpiece reaches the preset value or whether the machining step is required to be repeated to further approximate the diameter of the workpiece to the preset value and stopping the machining step if a desired value is obtained from the measured diameter of the workpiece.

2. The electrochemical machining process as set forth in claim 1, wherein the diameter of the workpiece is changed as processed during the electrochemical machining and is calculated according to the following equation:

$$A_m = \pi[LD + H(D_o + 2D)/3]$$

wherein, $A_m$ is the surface area of the workpiece, which changes as the electrochemical machining process proceeds, represented in mm$^2$;

L is the length of the workpiece's portion to be processed, represented in mm;

D is the diameter of the workpiece's portion processed, which changes as the electrochemical machining process proceeds, represented in mm; and $D_o$ is the original diameter of the workpiece's portion to be processed, represented in mm.

3. The electrochemical machining process as set forth in claim 1, wherein the electric current to be applied across the electrodes is calculated according to the following equation:

$$i = A_m J$$

wherein, i is a current applied per time, represented in C/sec;

$A_m$ is the surface area of the workpiece's portion processed, which changes as the electrochemical machining process proceeds, represented in mm$^2$; and J is a current density, represented in C/mm$^2$ sec.

4. The electrochemical machining process as set forth in claim 1, wherein the quantity of electricity applied is calculated according to the following equation:

$$Q_t = Q_p + i\Delta t$$

wherein, $Q_t$ is the total quantity of electricity applied for entire machining time period, represented in C;

$Q_p$ is the quantity of electricity used in the previous machining round, represented in C; and $\Delta t$ is the electrochemical machining period of time, represented in sec.

5. The electrochemical machining process as set forth in claim 1, wherein the diameter of the workpiece processed changes as the electrochemical machining process proceeds and is calculated from the following equation:

$$\pi(D_o - D)[L(D_o + D)/4 + h(3D_o + 2D)/15]/a_e = Q_t$$

wherein,

D is the diameter of the workpiece, which changes as the electrochemical machining process proceeds, represented in mm;

$D_o$ is the original diameter of the workpiece's portion to be processed, represented in mm;

$Q_t$ is the total quantity of electricity applied for entire machining time period, represented in C;

L is the length of the workpiece's portion to be processed, represented in mm;

h is the practical length through which the workpiece is in contact with the electrolyte owing to the surface tension, represented in mm; and $a_e$ is an electrochemical equivalent volume constant of the workpiece.

6. The electrochemical machining process as set forth in claim 1, wherein the machining step is carried out in such a way that metal ions or the surface of immersed portions of the workpiece are controllably dissolved and diffused into the electrolyte through the application of the electric current across the electrodes.

7. The electrochemical machining process as set forth in claim 1, wherein the cathodic tool is made of carbon.

8. The electrochemical machining process as set forth in claim 1, wherein the electrolyte is a potassium hydroxide solution.

9. The electrochemical machining process as set forth in claim 8, wherein the electrolyte has a concentration of 4–6 mM.

10. The electrochemical machining process as set forth in claim 1, further comprising the step of cleaning the workpiece through sonication in acetone and distilled water to remove impurities from the surface of the workpiece prior to the preparatory step.

11. The electrochemical machining process as set forth in claim 1, wherein the contact point is a basis on which a volume to be additionally processed owing to the surface tension can be calculated from the following equation:

$$V_p = \pi h(-2D^2 - D_o D + 3D_o^2)/15$$

wherein, $V_p$ is a volume which is additionally processed owing to the surface tension generated when the workpiece is dipped into the electrolyte, represented in $mm^3$;

h is is the practical length through which the workpiece is in contact with the electrolyte owing to the surface tension, represented in mm;

D is the diameter of the workpiece's portion processed, which changes as the electrochemical machining process proceeds, represented in mm;

$D_o$ is the original diameter of the workpiece's portion to be processed, represented in mm.

* * * * *